_(12)_ United States Patent
Date et al.

[19]

[11] Patent Number: 6,153,843
[45] Date of Patent: **\*Nov. 28, 2000**

[54] HAND HELD CONTROL KEY DEVICE INCLUDING MULTIPLE SWITCH ARRANGEMENTS

[75] Inventors: Toshinori Date, Tokyo, Japan; Johnny D. Couch, San Jose; Sarah Mason Richmond, Foster City, both of Calif.

[73] Assignee: Sega Enterprises, Ltd., Tokyo, Japan

[ * ] Notice: This patent is subject to a terminal disclaimer.

[21] Appl. No.: 08/851,694

[22] Filed: May 6, 1997

Related U.S. Application Data

[60] Division of application No. 08/414,316, Mar. 31, 1995, Pat. No. 5,644,113, which is a continuation-in-part of application No. 08/367,577, Jan. 3, 1995, abandoned.

[51] Int. Cl.$^7$ ............................. H01H 3/00; H01H 13/70; A63F 9/00
[52] U.S. Cl. ........................ 200/339; 200/5 A; 200/341; 273/148 B; 463/37; 345/169
[58] Field of Search ...................................... 200/5 R, 5 A, 200/6 A, 512, 329–345; 345/156–158, 160, 161, 168, 169; 364/709.01–709.16; 273/148 B; 463/36–39

[56] References Cited

U.S. PATENT DOCUMENTS

| | | | |
|---|---|---|---|
| Re. 32,977 | 7/1989 | Gotoh et al. | 200/5 A |
| 3,823,309 | 7/1974 | Caruso | 200/5 A |
| 4,029,915 | 6/1977 | Ojima | 200/5 A |
| 4,127,740 | 11/1978 | Lamarche | 200/5 A |
| 4,469,330 | 9/1984 | Asher | 200/5 A |
| 4,687,200 | 8/1987 | Shirai | 200/5 A |
| 4,778,295 | 10/1988 | Bleuer | 400/485 |
| 4,896,003 | 1/1990 | Hsieh | 200/6 A |
| 4,969,647 | 11/1990 | Mical et al. | 273/85 G |
| 5,207,426 | 5/1993 | Inoue et al. | 273/148 B |
| 5,339,097 | 8/1994 | Grant | 345/168 |
| 5,396,030 | 3/1995 | Matsumiya et al. | 200/6 A |
| 5,426,449 | 6/1995 | Danziger | 345/168 |
| 5,528,235 | 6/1996 | Lin et al. | 341/22 |
| 5,644,113 | 7/1997 | Date et al. | 200/5 R |

FOREIGN PATENT DOCUMENTS 442029  4/1992  Japan .

*Primary Examiner*—J. R. Scott
*Attorney, Agent, or Firm*—Price and Gess

[57] ABSTRACT

A control-key device is provided for use as a controller for a video game including a direction specifying key mounted on a housing which an operator manipulates to control the play of a video game, where the surface of said direction specifying key comprises a combination of concave portions to facilitate use of the direction specifying key. The unit preferably comprises a push button and a housing including a hole through which the push button protrudes. The housing extends along a plane wherein said plane intersects a plane perpendicular to an axis of said push button at a predetermined angle, and said plane of said housing also extending parallel to a plane defined by the surface of said push button. In a preferred embodiment, the push button is mounted in a manner such that the push button has a rotation axis and a plurality of operating surfaces, where each of said plurality of operating surfaces includes a projection that forms a surface perpendicular to the rotational direction defined by said rotation axis.

6 Claims, 15 Drawing Sheets

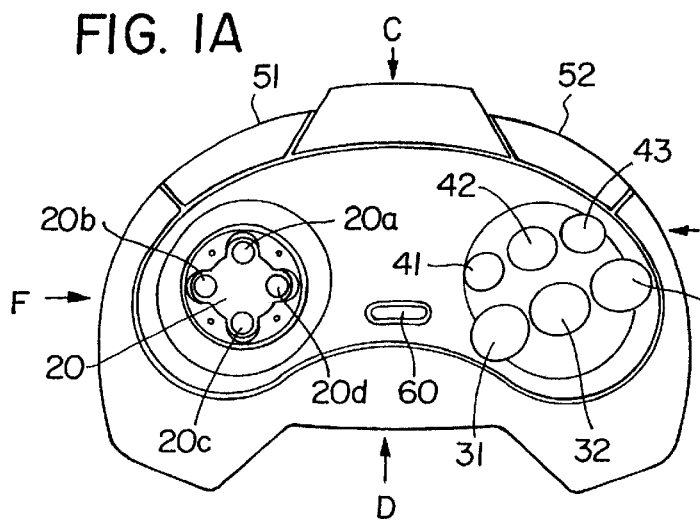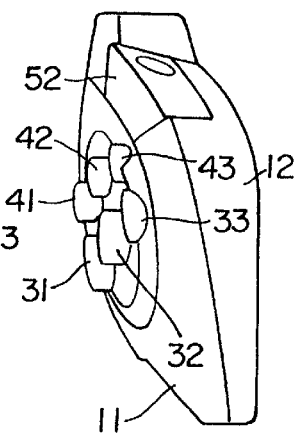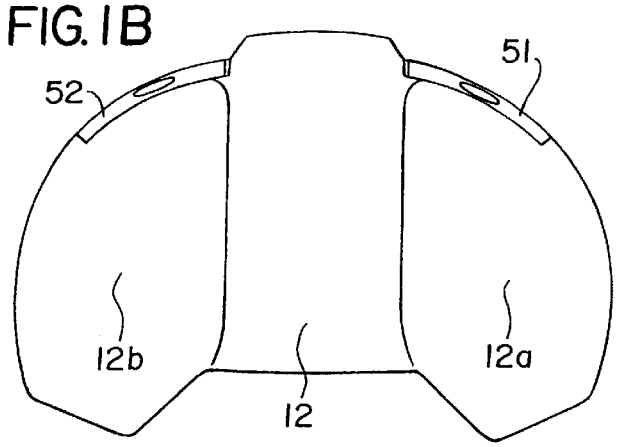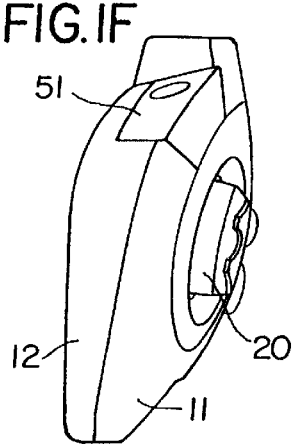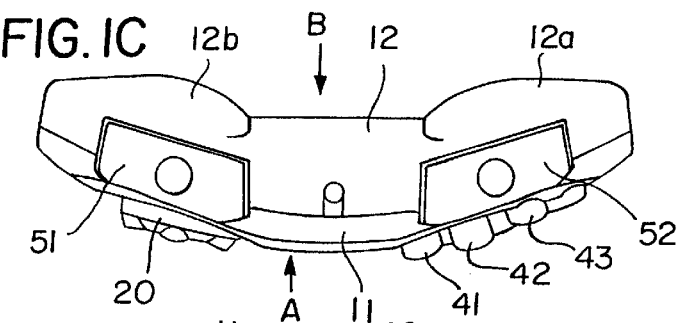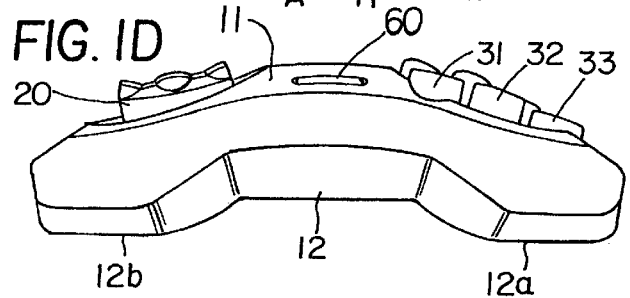

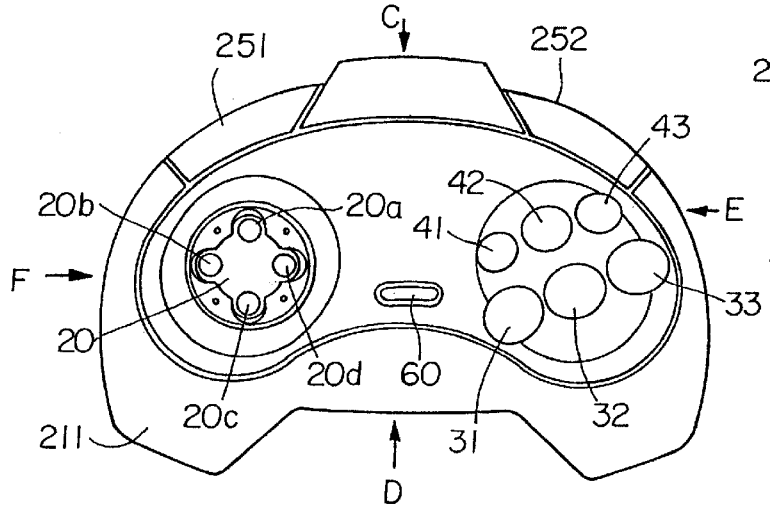
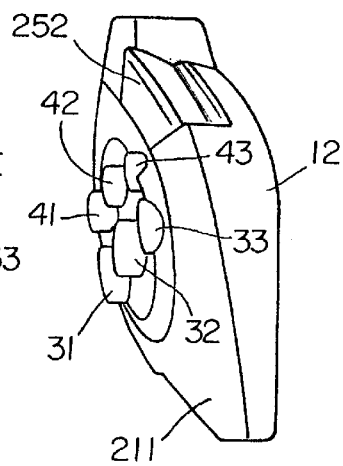
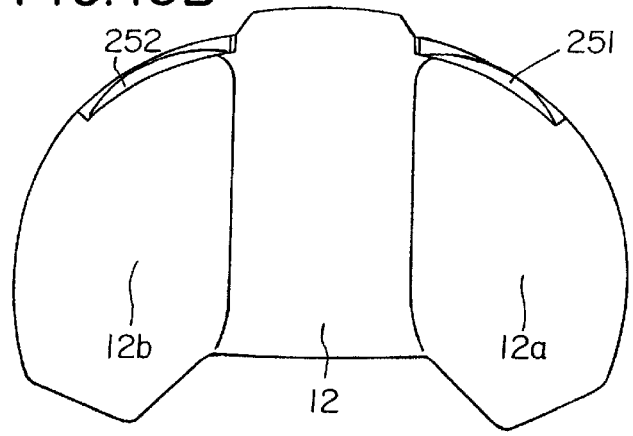
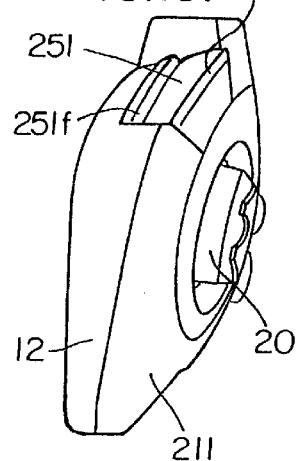
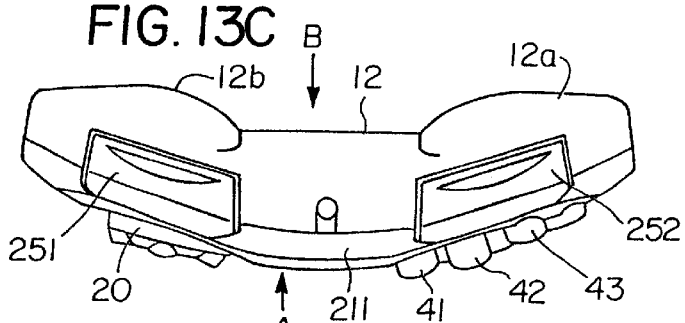
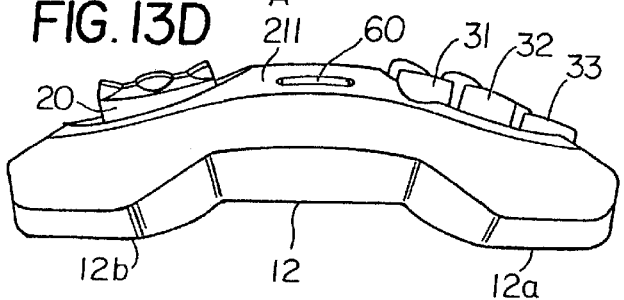

HAND HELD CONTROL KEY DEVICE INCLUDING MULTIPLE SWITCH ARRANGEMENTS

This Application is a divisional application of U.S. Ser. No. 08/414,316, filed on Mar. 31, 1995 now U.S. Pat. No. 5,644,113, which is a continuation-in-part of abandoned U.S. patent application Ser. No. 08/367,577, for a CONTROL KEY DEVICE filed on Jan. 3, 1995 abandoned.

BACKGROUND OF THE INVENTION,

1. Field of the Invention

The present invention relates to a control-key device, and in particular, to a control-key device, to be used by a single person having the control-key device with the person's two hands. The control-key device has many operating buttons which can be manipulated by a total of four fingers consisting of the forefingers and thumbs of the person.

2. Prior Art

Conventionally, in a television game machine or in a portable electronic game machine using a liquid crystal display plate, a control-key device having a direction specifying key is used. The direction specifying key is used to specify a direction along which a character moves. The character is realized by the television game machine or the portable electronic game machine can represent a human being or the like. Recently, a control-key device has, in addition to the direction specifying key, a plurality of buttons to be used for an operator's input of various commands into the game machine, the commands being required in the progress of the game.

An example of such control-key devices in the prior art is an operating device 300 for a game machine shown in FIG. 18 as described in Japanese Utility-Model Laid-Open Application No. 4-42029. The operating device 300 has a first operating unit 310, four second operating units 320, two third operating units, and two fourth operating units 330. The above-mentioned two third operating units are provided on a rear surface of the operating device respectively, and thus are not shown in the figure. An operator holds this operating device using two hands, and manipulates the first operating unit 310 and the left one of the two fourth operating units 330 using the thumb of the left hand, the left one of the two third operating units using the forefinger thereof, the right one of the two third operating units using the forefinger of the right hand, the four second operating units 320 and the right one of the two fourth operating units 330 using the thumb thereof.

However, a control-key device in the related art such as the operating device 300 has a plane configuration. Such a plane configuration of a control-key device is not always the best for the hands of an operator who is operating the control-key device. The operator is holding the control-key. That is, in a control-key device having such a configuration, if an operator attempts to hold the control-key device using two hands and continuously manipulates operating units such as buttons and the direction specifying key provided on the device using the thumbs and forefingers for a long time, the hands are likely to become tired.

SUMMARY OF THE INVENTION

The present invention discloses a control-key device or controller for a video game machine that can be conveniently operated by both hands of an operator. A housing has an upper surface of a spherical configuration with an approximately circular outer perimeter along a significant portion of the housing to permit contact with the respective fingers and palms of each of the operator's hands. A bottom outer perimeter is indented, while the lower surface has separate right and left convex sections extending, respectively, inwardly from the circular outer perimeter and terminating on a flat lower surface to permit the respective middle and second to last fingers of the respective operator's hands to hold the lower surface of the housing. The combination of the spherical upper surface and the convex lower surfaces provide obovoid hand grip configurations that naturally position the operator's fingers in a comfortable state. The respective middle and second to last fingers of the respective operator's hands can grasp the lower surface of the housing. A first control button, such as a directional key or button, can be formed on one side of the upper surface of the housing in a slight concave portion. A plurality of second control buttons can be mounted on the other side of the upper surface of the housing on a slight concave portion so that the respective right and left thumb of the operator can manipulate these control buttons. A start control button can be positioned between these thumb-controlled keys or buttons. The circular outer perimeter can also incorporate an L-shaped pivoting switch member on either side of the housing in a position to be readily activated by the respective forefingers of the operator. The pivoting switch members can have an L-shaped configuration so that they extend along the circular outer perimeter in a traverse direction to the spherical upper surface and then extend across the upper surface in a complementary fashion whereby the operator can activate these switches with either of the forefinger or the thumb. The housing component parts can be molded from a plastic material and can integrally include substrate supporting posts and guide members for the insertion of control buttons. Electrical contact pad circuit substrates can be mounted so that they can be bent within the housing and can be matched with rubber electric contact pads, which can be controlled by the respective directional key and operator push buttons. The arrangement of the parts are created to minimize any mold shrinkage problems and to accommodate the curvilinear configuration of the controller of the present invention.

Other objects and further features of the present invention will become more apparent as a result preferred embodiments being described with reference to the accompanying drawings.

BRIEF DESCRIPTION OF THE DRAWINGS

FIGS. 1A, 1B, 1C, 1D, 1E, and 1F show an outward form of a control-key device in a first embodiment of the present invention;

FIGS. 13A, 13B, 13C, 13D, 13E, and 13F show an outward form of a control-key device in a third embodiment of the present invention;

DESCRIPTION OF PREFERRED EMBODIMENTS

With reference to figures, a control-key device in a first embodiment of the present invention will now be described.

Figure 2:
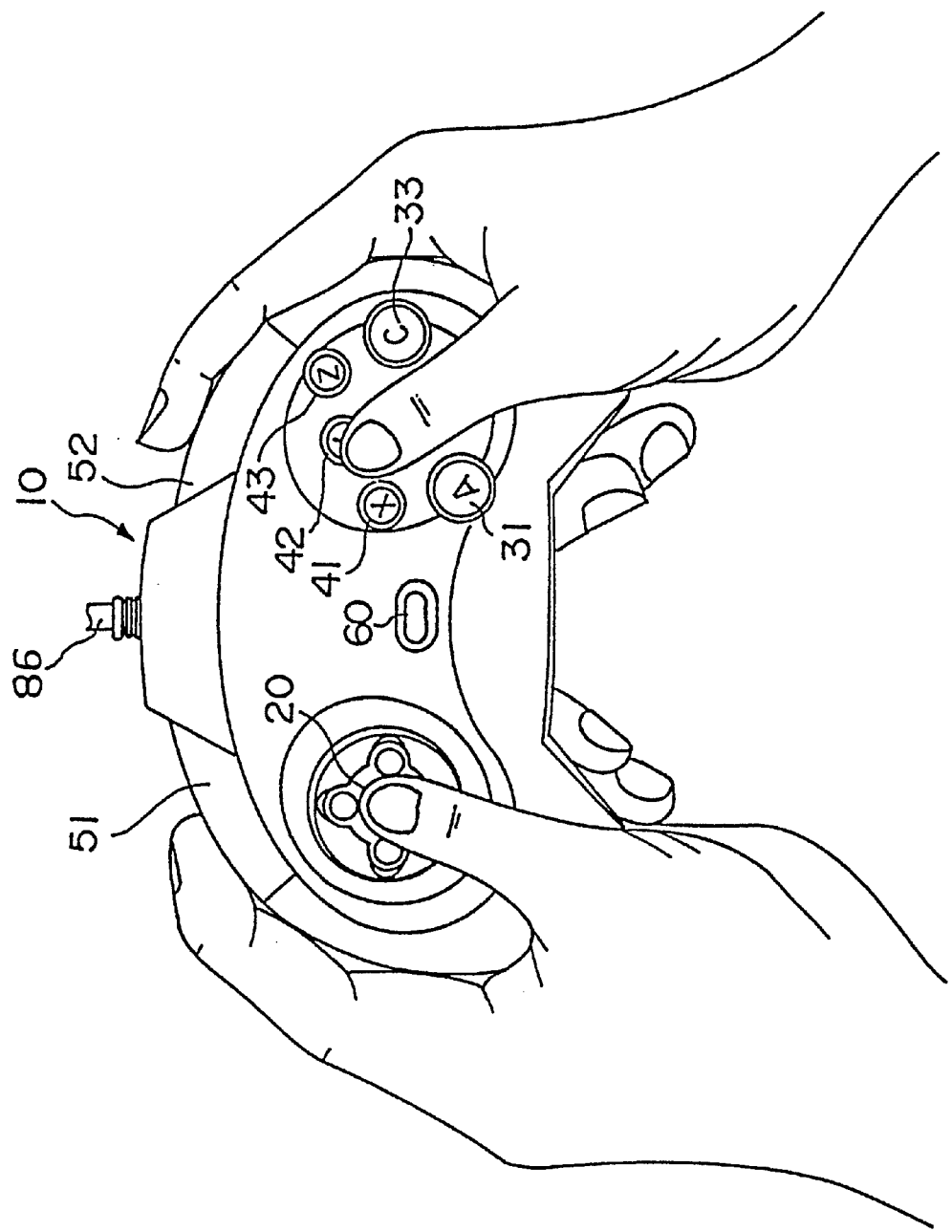
FIG. 2 shows a state in which the control-key device shown in FIGS. 1A, 1B, 1C, 1D, 1E, and 1F is manipulated.

FIGS. 1A, 1B, 1C, 1D, 1E, and 1F shows the control-key device 10 in a first embodiment of the present invention. FIG. 1A shows a plan view, FIG. 1B shows a bottom view, FIG. 1C shows a rear view obtained as a result of viewing along a direction C of FIG. 1A, FIG. 1D shows a front view obtained as a result of viewing along a direction D of FIG. 1A, FIG. 1E shows a right side elevational view obtained as a result of viewing along a direction E of FIG. 1A, and FIG. 1F shows a left side elevational view obtained as a result of viewing along a direction F of FIG. 1A. Further, FIG. 2 shows a state in which an operator is holding the control-key device 10 using two hands of the operator.

The control-key device 10 has a top case 11 and a bottom case 12. As shown in FIGS. 1C and 1D, the entirety of the control-key device 10 is curved so that bottom case 12 may be located at a side of the curving center. Further, left and right sides of the bottom case 12 project gently. The thus-projecting portions will be referred to as projecting portions 12a and 12b, hereinafter. The curved shape of the top and bottom cases 11 and 12 including the projecting portions 12a and 12b is a shape that an operator can easily hold using two hands as shown in FIG. 2 so that fingers and the finger base portions of the palms cover the device.

The housing has a circular outer perimeter for contact with the operator's hands while the upper housing surface is approximately spherical and the lower surface has convex portions to simulate with the upper surface a pair of approximately obovoid shapes to fit within the operator's fingers on either hand.

Dimensions of the control-key device 10 are optimized to be held by the two hands. The top and bottom cases 11 and 12 are made from ABS resin and formed in a resin molding method. However, the material thereof is not limited to the ABS resin.

As shown in FIG. 1A, a direction specifying key 20 is provided at the left side on the top surface of the top case 11, and a total of 6 buttons, an A button 31, a B button 32, a C button 33, an X button 41, a Y button 42, a Z button 43 are provided at the right side. Further, a start button 60 is provided at the middle on the top surface of the top case. Further, an L button 51, and an R button 52 are provided at the left and right on the rear surface. However, the number of buttons are not limited to the above-mentioned A, B, C, X, Y, and Z buttons, and also the number of buttons to be provided is not limited to 6.

The direction specifying key 20 is, as described above, used for a purpose such as that of specifying directions along which a character such as a simulated human being or the like moves in a game realized by a game machine having the control-key device 10. The other buttons 31, 32, 33, 41, 42, 43, 51, 52 and 60 are means for inputting various commands regarding progress of the game.

As shown in FIG. 2, the direction specifying key 20 is manipulated using the thumb of the left hand, and the A, B, C, X, Y and Z six buttons 31, 32, 33, 41, 42, and 43 are manipulated using the thumb of the right hand. The start button 69 is manipulated using a thumb of either one of the left and right hands. Further, the L button 51 and R button 52 are manipulated using the forefingers of the left and right hands. Positions of these key and buttons are determined, combined with the shape of the whole control-key device 10, such that the manipulating thumbs and fingers are easily placed on the positions when the two hands are used for holding the control-key device 10 as shown in FIG. 2. Therefore, the hands of an operator may not be tired even if the operator continuously manipulates each key and button for a long time.

Figure 3:
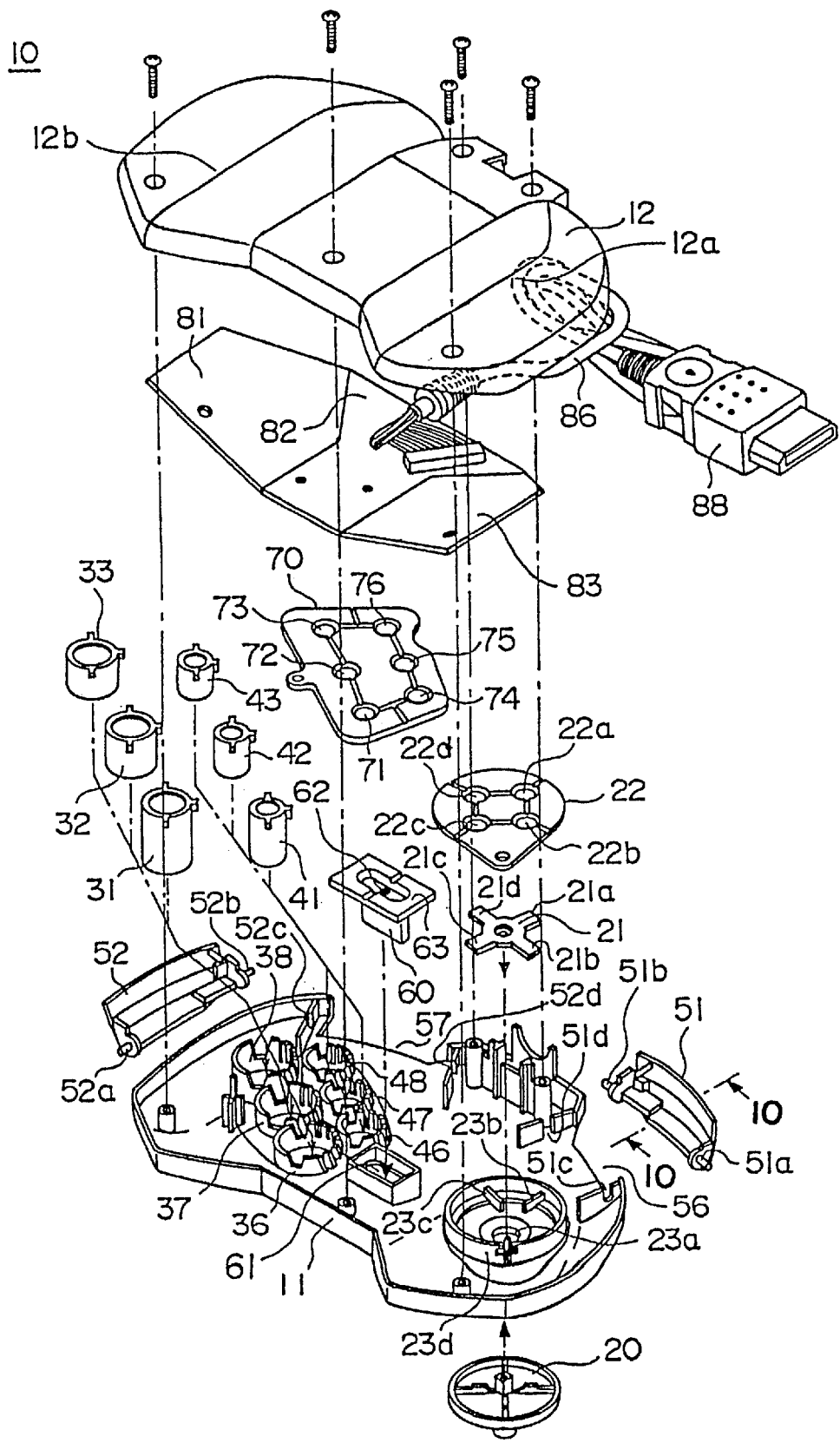
FIG. 3 shows an exploded perspective view of the control-key device shown in FIGS. 1A, 1B, 1C, 1D, 1E, and 1.

FIG. 3 shows an exploded perspective view of the control-key device 10. In the figure, for the sake of convenience in description, the control-key device 10 is disposed in a manner in which the bottom case 12 is located at the top.

Each of the buttons 31, 32, 33, 41, 42, and 43 having an approximately cylindrical shape is inserted into a respective one of button guiding portions 36, 37, 38, 46, 47 and 48 from the inside of the top case 11. These button guiding portions 36 through 38 and 46 through 48 have inner walls having approximately cylindrical shapes which have inner diameters slightly larger than outer diameters of the cylindrical shapes of the relevant buttons. The button guiding portions are in a unit together with the top case 10, and are molded at the same time the top case 11 is molded. That is, the button guiding portions and the top case 11 are molded in an integral molding method and thus they are in a unit without requiring or connection with one another after being molded.

Although the integral molding has been described above, only the button guiding portions may be separated bodies for the sake of simplicity of metal mold manufacturing. In this case, each of the six button guiding portions is formed as a result of integrally molding a cylindrical body portion and a mounting portion constituting a surface extending along the inner surface of the top case. The mounting portion is provided with a plurality of openings. The inner surface of the top case which is integrally molded in a state without these guiding portions is provided with a plurality of approximately vertically projecting bosses at predetermined positions on the inner surface thereof, which bosses are suitable for the above-mentioned openings of the mounting portions. The six button guiding portions are mounted on the inner surface of the top case as a result of these bosses being inserted into the openings of the mounting portions respectively.

The direction specifying key 20 having an approximately cross shape is linked with a rubber push member 21 in a mutual center axis via a through hole 23a formed in the top case 11. Movement of the direction specifying key 20 which was thus provided outside the top case 11 is communicate to the rubber push member 21 located inside the top case 11. The inside of the top case 11 is provided with a cylindrical control wall 23d which controls movement of the rubber push member 21. Further, rotation preventing portions 23b and 23c are provided at the top left part in FIG. 3 of the inside of the control wall 23d. These control wall 23d and rotation preventing portions 23b and 23c are in a unit together with the top case 11, and are molded at the same time as the time the top case is molded. That is, the control wall 23d and rotation preventing portions 23b and 23c and top case 11 are molded in an integral molding method and thus they are in a unit without connecting with one another after being molded.

Further, the start button 60 is inserted into a through hole 61 formed in the top case 11 from the inside of the top case 11.

Each of shaft portions 51a, 51b, 52a, 52b of the left and right L button 51 and R button 52 is fitted into a respective one of bearing portions 5ic, 51d, 52c, 52d provided on an inner wall surface of the top case 11. Each of the buttons 51 and 52 is fitted into a respective one of cut-out portions 56 and 57 provided in the top case 11. The above-mentioned bearing portions 51c, 51d, 52c and 52d are in a unit together with the top case 11 and are molded at the same time the top case is molded. That is, the bearing portions and the top case 11 are molded in an integral molding method and thus they are in a unit without connecting with one another after being molded.

A a six point rubber contact member 70 is placed on, in FIG. 3, each of the above-mentioned A, B, C, X, Y, Z buttons 31, 32, 33, 41, 42, 43. Further, a four point rubber contact member 22 is placed on the rubber push member 21. An electrical conductive member is provided on a top surface, in FIG. 3, of each of contact portions 71, 72, 73, 74, 75, 76, and 22a, 22b, 22c, 22d of these rubber contact members. The other portions of these rubber contact members 70 and 22 are made from insulating rubber. The above-mentioned top surfaces of the contact portions 71 through 76 and 22a, 22b, 2c, 22d of these rubber contact members 70, 22 are dented downward in FIG. 3. Corresponding bottom surfaces project downward. These projecting portions come into contact with respective buttons 31, 32, 33, 41, 42, 43, and come into contact with respective extending portions 21a, 21b, 21c, 21d, extending in a cross shape, of the rubber push member 21.

Figure 6:
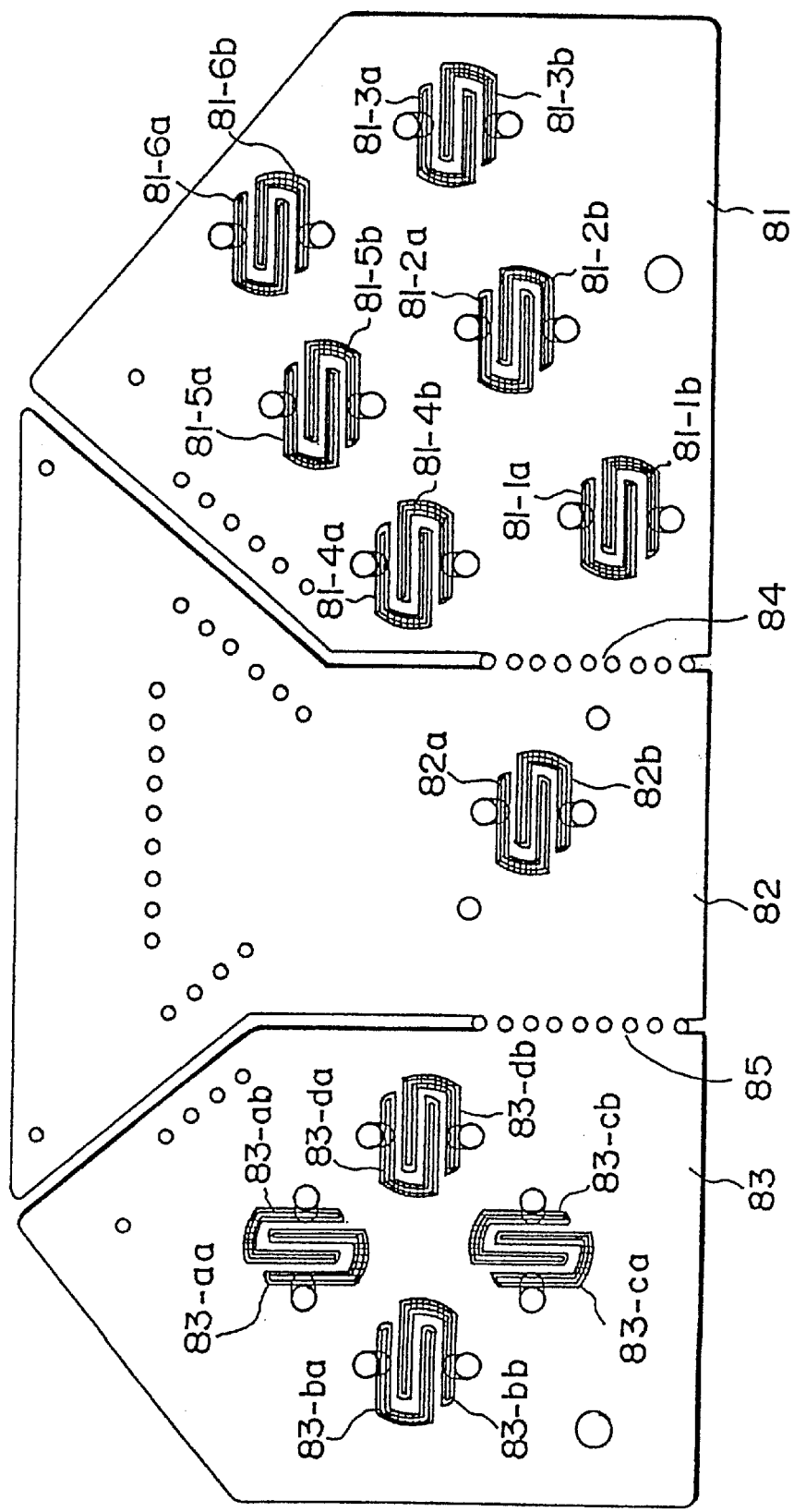
FIG. 6 shows circuit substrates of the control-key device shown in FIGS. 1A, 1B, 1C, 1D, 1E, and 1F.

The above-mentioned dented and projecting configurations are formed by the rubber materials of the rubber contact members 70, 22, and thus can be deformed elastically. A shape of each of these dented, projecting configurations is elastically changed in response to upward movement of a respective one of the buttons 31, 32, 33, 41, 42, 43 and the extending portions 21a, 21b, 21c, 21d of the rubber push member 21, as a result of being manipulated by an operator. By such elastic form changing, a corresponding contact portion of the contact portions 71 through 76, 22a, 22b, 22c, 22d is upwardly moved, and a corresponding contact pair, provided on circuit substrates 81, 83, (shown as a bottom surface in FIG. 3) are electrically connected. The respective contact pairs 81-8a, 81-1b, 81-2a, 81-2b, 81-3a, 81-3b, 81-4a, 81-4b, 81-5a, 81-5b, 81-6a, 81 -6b, and 83-aa, 83-ad, 83-ba, 83-bb, 83-ca 83-cb, 83-da, 83-db, are shown in FIG. 6) is short-circuited. These contact pairs are connected to a game machine via a cable 86 and a plug 88, and, by short-circuiting of a contact pair, a predetermined signal is given to the game machine.

A similar rubber contact member 63 is provided at the top end, in FIG. 3, of the start button 60, and similarly to the above-mentioned situation, a contact portion 62 of an electrical conductive material short-circuits a corresponding contact pair, provided on a circuit substrate 82, (82a, 82b shown in FIG. 6), in response to upward movement, in FIG. 3, of the start button 60 as a result of being manipulated by the operator.

The shapes of the button guiding portions 36, 37, 38, 46, 47, 48 will now be described with reference to FIGS. 4A and 4B.

Figure 4A:
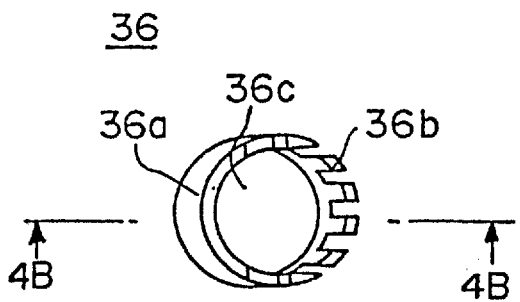
FIGS. 4A and 4B show shapes of button guiding portions of the control-key device shown in FIGS. 1A, 1B, 1C, 1D, 1E, and 1F.
Figure 4B:
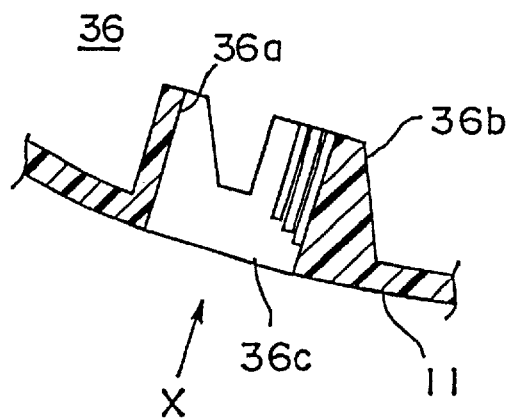

FIG. 4A shows a plan view of the button guiding portion 36, and FIG. 4B shows a longitudinal sectional view along a B—B line of FIG. 4A thereof. Because the other button guiding portions 37, 38, 39, 46, 47, 48 have shapes similar to the shape of the button guiding portions 36 shown in FIGS. 4A and 4B, description thereof is omitted.

The button guiding portion 36 includes a through hole 36c passing through the top case 11, and a first wall 36a and a second wall projecting from the inner wall surface of the top case 11. Because the entirety of the control-key device has a curved shape, a portion of the top case in which the button guiding portion 36 is formed is inclined right-side down as shown in FIG. 4B. The first wall 36a constitutes an approximate left half circumference of a cylinder in FIGS. 4A and 4B. The second wall 36b constitutes an approximate right half circumference. The first wall 36a extends approximately perpendicular to a portion of the top case in which the button guiding portion is formed, that is, approximately along a direction X of FIG. 4B. An inner wall surface of the second wall 36b also extends approximately along the direction X of FIG. 4B. Because of this inner wall surface of each of the first and second walls 36a and 36b, movement of the button 31 along the direction X is guided. All outer wall surface of the second wall 36b extends along a direction slightly leftwardly inclined from the vertical direction of FIG. 4B. By applying these configurations, a mold can be removed when the top case 11 including the button guiding portion 36 is molded. The mold used in the molding work is removed along the vertical direction in FIG. 4B.

A case where the outer wall surface of the second wall 36b extends in parallel to its inner wall surface, that is, along the direction X will now be considered. In this case, a portion of an upper mold which corresponds to the outer wall surface of the second wall 36b comes into the outer wall surface of the second wall 36b and this portion cannot be removed upward. In order to enable a mold to be removed in a molding work, it is necessary to apply a sectional shape such as that shown in FIG. 4B to the second wall 36*b*. This condition is required for the following reason: The inner wall surface of the second wall 36*b* is a right wall, in FIGS. 4A and 4B, of the button guiding portion 36 having the approximately cylindrical shape, that is, a wall of a lower side in the inclination of the top case 11.

A reason why it is necessary to divide the second wall 36*b* in top and bottom directions of FIG. 4A will now be described. Generally speaking, in a resin molding process, it is necessary to make a wall thickness to be approximately uniform. This is because, if a wall thickness is not uniform, a shrinkage amount of a resin is uniform when the molded resin is cooled in the molding process. As a result, it is likely that the molded shape may be deformed in the cooling process. This is because a shrinkage rate is constant independently of a wall thickness and thus a shrinkage amount in a thick portion is larger than a shrinkage amount in a thin portion. In order to prevent such deformation from occurring, it is necessary to make a wall thickness of a shape to be molded to be uniform. Further, it is necessary to apply a shape such as that shown in FIG. 4B to a sectional shape of the second wall 36*b* so that the button 31 may be guided along the direction X as mentioned above. If the second wall 36*b* is not divided, a wall thickness of the second wall 36*b* is thicker than a wall thickness of another portion. In order to prevent such a situation, the second wall 36*b* is divided into a plurality of divisions as shown in FIG. 4A so that a wall thickness of each division is equal to a wall thickness of another portion.

Figure 5A:
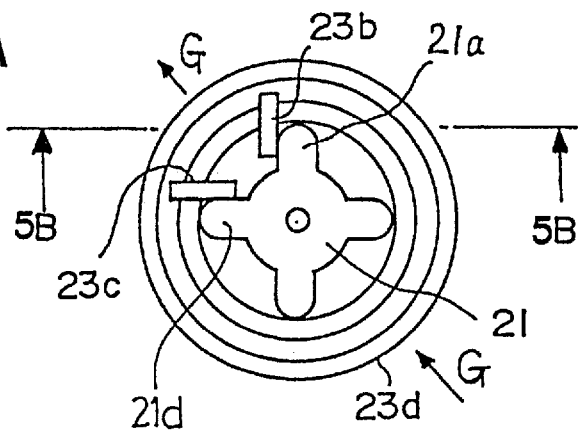
FIGS. 5A and 5B show positions at-which rotation preventing portions are provided in the control-key device shown in FIGS. 1A, 1B, 1C, 1D, 1E, and 1F.
Figure 5B:
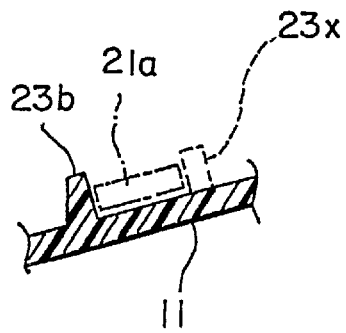

With reference to FIGS. 5A and 5B, positions of rotation preventing portions 23*b* and 23*c* of the rubber push member 21 will now be described. FIG. 5A shows a state in which the rubber push member 21 has been fitted to the control wall 23*d* and the rotation preventing portions 23*b* and 23*c*. The control wall 23*d* and the rotation preventing portions 23*b* and 23*c* are provided along an inclination surface, of the top case 11, resulting from the above-mentioned general curved shape of the control-key device 10. An inclination direction of the above-mentioned inclination surface is shown by an arrow G in FIG. 5A, the inclination being from an upper side to a lower side along the direction G. As shown in FIG. 3, the top case is placed in a manner in which the rear surface of the top case faces upward.

FIG. 5B shows a longitudinal sectional view of the rotation preventing portion 23*b* taken along a line B—B of FIG. 5A. As shown in FIG. 5B, a left side wall surface, in the figure, of the rotation preventing portion 23*b* extends along an approximately vertical direction of the figure, and the right side wall surface (an wall surface adjacent to the extending portion 21*a* of the rubber push member 21) extends approximately perpendicular to a portion, shown in the figure, of the inner wall surface of the top case 11. Because the left side wall surface (a wall surface at the side reverse to the extending portion 21*a* of the rubber push member 21) thus extends along an approximately vertical direction of FIG. 5B, an upper mold can be removed upward of the figure (vertically upward in FIG. 5B) when the top case 11 including the rotation preventing portion 23*b* is molded in a resin molding process. The direction in which a mold is removed in the resin molding process is referred to as a mold removing direction. Further, because the right side wall surface of the rotation preventing portion 23*b* extends approximately perpendicular to the inner wall surface of the top case 11, the rotation preventing portion 23*b* can perform a desired function of preventing the rubber push member 21 from being rotated and also of allowing a movement, of the rubber push member 21, perpendicular to the inner wall surface of the top case 11.

Such a configuration can be realized as a result of the rotation preventing member 23*b* is provided at the left side, in FIG. 5B, of the extending portion 21*a* of the rubber push member 21, that is, the lower side in the inclination surface of the top case 11. A case where, contrarily to this, such a rotation preventing portion is provided in a position shown in a broken line shown in the figure, that is, the right side, in the figure, of the extending portion 21*a*, that is, at the higher side in the inclination surface of the top case 11 will now be considered. It is necessary that the left side wall surface (a wall surface adjacent to the extending portion 21*a* of the rubber push member 21) of this rotation preventing portion 23*x* shown by the broken line extends approximately perpendicular to the inner wall surface of the top case 11 so as to perform the above-mentioned function of the rotation preventing member. When it is attempted that such a rotation preventing portion 23*x* is molded in a resin molding process, the left side wall surface, in the figure, of this rotation preventing portion 23*x* comes into contact with a corresponding portion of a mold so that the upper mold cannot be removed upward. In order to prevent such a situation from occurring, the rotation preventing portions are provided at the lower sides, in the inclination surface of the top case 11, of the extending portions 23*a* and 21*d*, respectively.

Similar explanation can be used for the other rotation preventing portion 23*c*, and thus the explanation will be omitted.

In order to prevent the rotation of the rubber push member 21 having a shape such as that shown in FIGS. 5A and 5B, it is necessary that at least two rotation preventing portions such as the rotation preventing portions 23*b* and 23*c* are provided. A straight line is referred to as an inclination center line, which straight line extends along a relevant portion of the inner wall surface of the top case 11, which straight line also extends along a direction, in which direction a slope of the inclination of the inner wall surface of the relevant portion of the top case 11 with respect to a plane perpendicular the mold removing direction in the resin molding process is the largest, and also the straight line passes through the center axis of the rubber push member 21. The inclination center line is coincident with a straight line connecting two arrows G in FIG. 5A.

Figure 7:
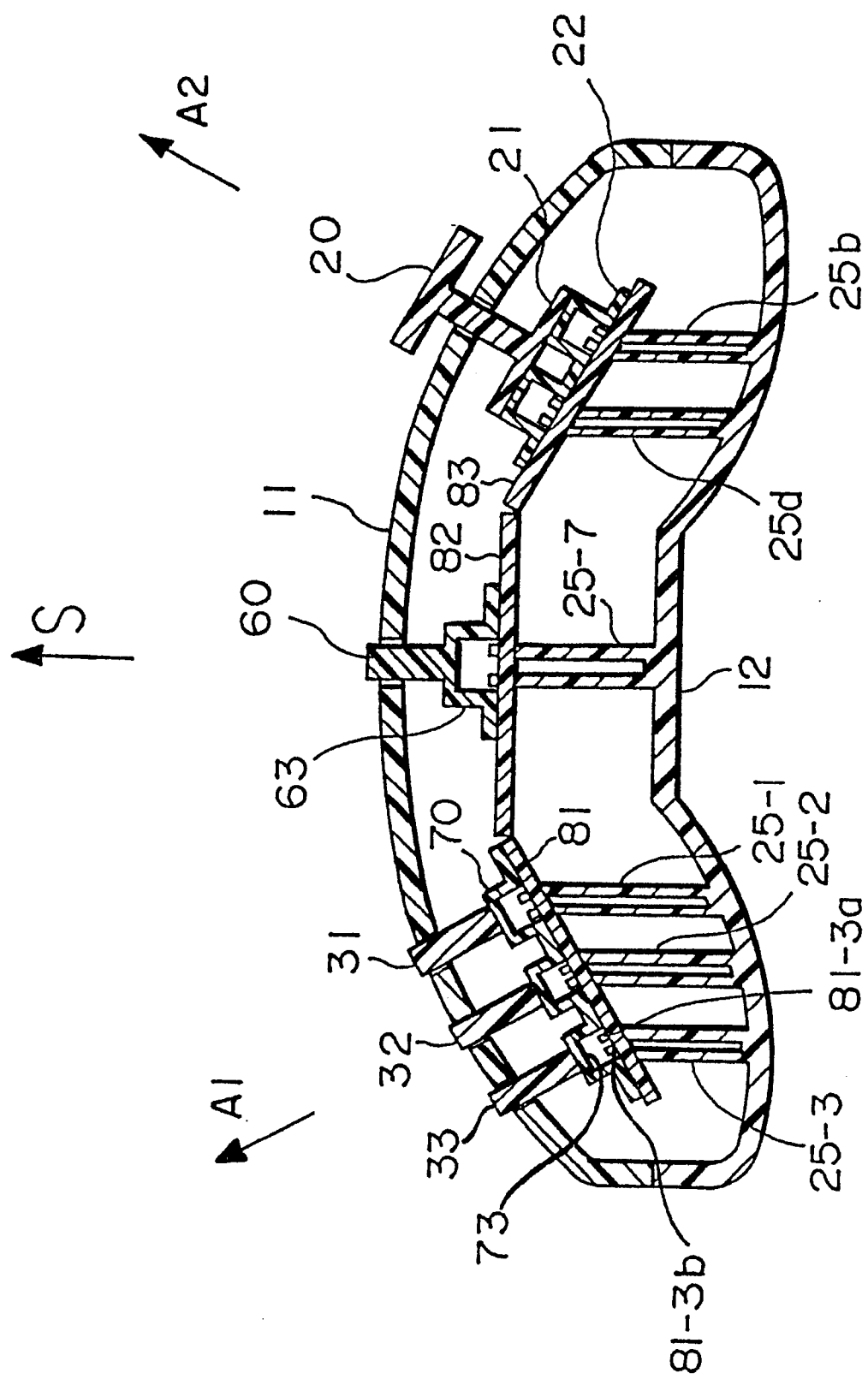
FIG. 7 shows a state of the circuit substrates in the control-key device shown in FIGS. 1A, 1B, 1C, 1D, 1E, and 1F.

With reference to FIGS. 6 and 7, circuit substrates 81, 82 and 83 will now be described. FIG. 7 shows a longitudinal sectional view of the control-key device 10, and, in particular, shows a state, in which the buttons 31, 32, 33 and the key 20 are mounted on different planes, serving as one feature of the present invention.

The circuit substrates 81, 82 and 83 are formed as a unit of a substrate as shown in FIG. 6. Then, after the circuit substrates 81, 82 and 83 are connected through electric wires therebetween, that is folded at a dividing portions 84 and 85 and thus divided physically. As a result of thus dividing, the substrates 81 and 83 at the two sides of the originally plane-shaped circuit substrates 81, 82 and 83 are inclined in a manner in which the outer edges thereof is downwardly lowered as shown in FIG. 7, and thus it is possible to adapt them to the above-mentioned general curved shape of the control-key device 10.

That is, the left and right edges of the top case 11 are inclined in a manner in which they are downwardly lowered so as to match the general curved shape of the control-key device 10. As further matching this, as shown in FIG. 7, an axis direction A1 of each of the A, B, C, X, Y, Z buttons 31, 32, 33, 41, 42, 43 is perpendicular to an inclined surface of the top case 11, that is, this axis direction A1 is slightly inclined outside (to the left side in FIG. 7) from the vertical direction S in FIG. 7. Similarly, an axis direction A2 (a reference direction of various directions along which the direction specifying key 20 is inclined when it is manipulated) of the direction specifying key 20 and rubber push member 21 connected thereto is inclined slightly outside (to the right side in FIG. 7) from the vertical direction S in FIG. 7. In order to correspond to these inclinations of the axis directions A1 and A2 of the buttons and key, the rubber contact members 70 and 22 are inclined in a manner matching the manner of the above-mentioned inclination of the top case 11. In order to correspond to these inclinations of the rubber contact members 70 and 22, it is necessary to incline corresponding two side circuit substrates 81 and 83.

Figure 8:
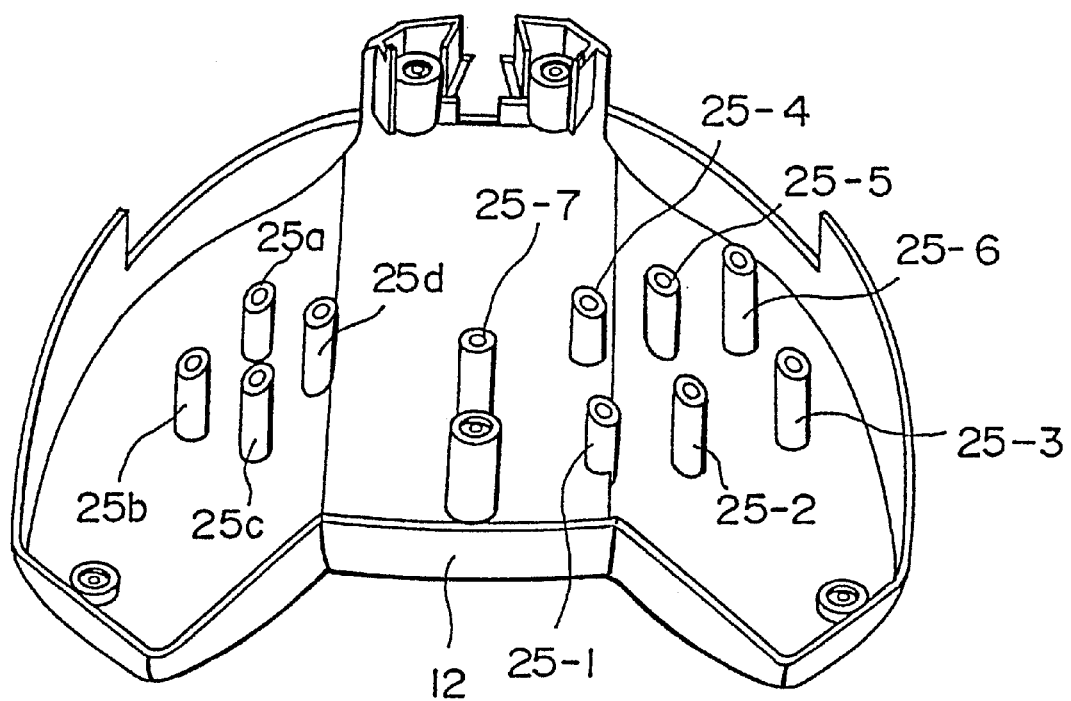
FIG. 8 shows the inside of a bottom case of the control-key device shown in FIGS. 1A, 1B, 1C, 1D, 1E, and 1F.

With reference to FIGS. 8 and 7, substrate supporting posts provided on the inner wall surface of the bottom case will now be described.

FIG. 8 shows a view of the inner wall surface obtained when it is viewed from a front, oblique top view. Eleven substrate supporting posts 25-1, 25-2, 25-3, 25-4, 25-5, 25-6, 25-7, 25a, 25b, 25c and 25d projecting in an approximately vertical direction of the figure are provided. Each of the substrate supporting posts has a cylindrical shape, and are molded in a unit together with the bottom case 12, and molded at the same time the bottom case 12 is molded. That is, the substrate supporting posts and the bottom case 12 are molded in an integral molding method and thus they are in a unit without connecting with one another after being molded. Each of these substrate supporting posts 25-1, 25-2, 25-3, 25-4, 25-5, 25-6, 25-7, 25a, 25b, 25c and 25d is located approximately right beneath a respective one of the contact pairs (81-1a, 81-1b), (81-2a, 81-2b), (81-3a, 81-3b), (81-4a, 81-4b), (81-5a, 81-5b), (81-6a, 81-6b), (82a, 82b), and (83-aa, 83-ab), (83-ba, 83-bb), (83-ca, 83-cb), (83-da, 83-db) as shown in FIG. 6.

By applying such a configuration, a pressing force applied by an operator to each of the buttons 31, 32, 33, 41, 42, 43, 60 and direction specifying key 20 is transmitted to a respective one of the substrate supporting posts 25-1, 25-2, 25-3, 25-4, 25-5, 25-6, 25-7, 25a, 25b, 25c and 25d via the rubber contact members 70, 63 and 22 and the circuit substrates 81, 82 and 83. In this moment, because a position at which the pressing force is applied is approximately aligned with a top end surface of a relevant substrate supporting post as shown in FIG. 7, the pressing force does not generate a force which deforms the circuit substrates 81, 82 and 83, and the pressing force can be released to the bottom case 12 via the substrate supporting post. Therefore, deformation of the circuit substrates and damaging thereof which may occur as a result of increasing force can be prevented.

As a result of using the substrate supporting posts each having a cylindrical shape having a small diameter as structures which support the circuit substrates 81, 82 and 83, it is possible to sparsely scatter the substrate supporting posts on the bottom case 12. As a result of thus sparsely scattering the structure parts for supporting the circuit substrates on the inner wall surface of the bottom case 12, when the bottom case 12 including the circuit substrate supporting structure parts is molded in a resin molding process, even when the molded member is shrunk due to cooling thereof after molding, undesirable deformation can be prevented from occurring in the bottom case 12.

For a comparison purpose, a case will now be considered where substrate supporting posts consisting of small diameter cylinders as in the present invention are not used as circuit substrate supporting structure parts, and a combination of concentric cylinders are used therefor. For example, for the six buttons 31, 32, 33, 41, 42, and 43, concentric cylinders are provided instead of the six substrate supporting posts 25-1 through 25-6, which cylinders includes a size of a cylinder which covers positions at which these six substrate supporting posts project. In a case where such a structure is used, these cylinders are to extend for considerable lengths on the inner wall surface of the bottom case 12. When the bottom case 12, having a structure in which these structure parts are provided, is formed in a resin molding process, because of differences in shrinkage rates between the cylinder portion and the wall surface portion of the bottom case, when the resin is cooled after being molded, undesirable deformation may occur in the portion in which the cylinders are provided.

The top end surface of each of the substrate supporting posts 25-1, 25-2, 25-3, 25-4, 25-5, 25-6, 25-7, 25a, 25b, 25c and 25d is inclined in a manner matching a manner of the above-mentioned inclinations of the circuit substrates 81 and 83. That is, the top end surface of each of the substrate supporting posts 25-1, 25-2, 25-3, 25-4, 25-5, and 25-6 is inclined in a manner in which the right side, in FIG. 8, is lowered, and the top end surface of each of the substrate supporting posts 25a, 25b, 25c and 25d is inclined in a manner in which the left side, in FIG. 8, is lowered.

Figure 9A:
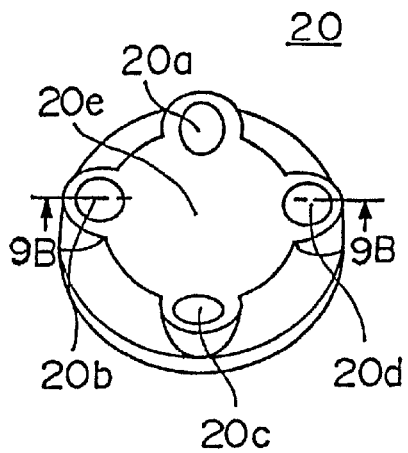
FIG. 9A and 9B show a shape of a manipulating surface of a direction specifying key of the control-key key device shown in FIGS. 1A, 1B, 1C, 1D, 1E, and 1F.
Figure 9B:
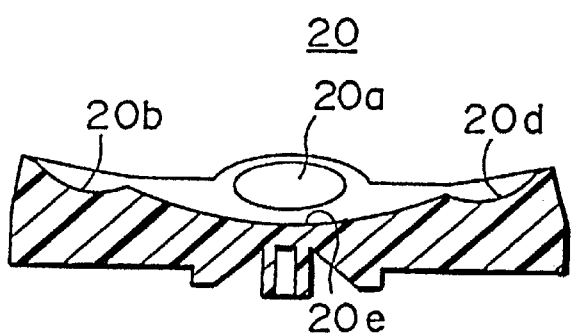

With reference to FIGS. 9A and 9B, a shape of a surface of the direction specifying key 20 shown in FIG. 1A will now be described. FIG. 9A shows a view obtained as a result of viewing the top surface of the direction specifying key 20 from a front, oblique top view, and FIG. 9B shows a longitudinal sectional view taken along a line B—B of FIG. 9A.

This top surface of the direction specifying key 20 has a central concave portion 20e and a total of four concave portions 20c, 20a, 20b and 20d provided at the front, rear, left and right thereof. By manipulating the direction specifying key 20 in a manner in which any one of the front, rear, left and right concave portions 20c, 20a, 20b and 20d is lowered, a relevant one of the extending portions 21c, 21a, 21b and 21d of the rubber push member 21 is lowered, that is, is lifted in FIG. 3. In response to this, a relevant one of the contact portions 22c, 22a, 22b and 22d of the rubber contact member 22 is lifted, and thus a relevant one of the contact pairs (83-ca, 83-cb), (83-aa, 83-ab), (83-ba, 83-bb) and (83-da, 83-db) are short-circuited.

A shape of each of the front, rear, left and right concave portions 20c, 20a, 20b and 20d and central concave portion 20e is a concave shape and is a shape of a part of a sphere. A curvature radius of the concave shape of each of the front, rear, left and right concave portions 20c, 20a, 20b and 20d is smaller than a curvature radius of the concave shape of the central concave portion 20e. Further, approximately an inner half of each of the front, rear, left and right concave portions 20c, 20a, 20b and 20d is formed in a peripheral portion of the central concave portion 20e. Such a shape of the top surface of the direction specifying key 20 fits a finger tip of a hand, and thus an operator can manipulate the direction specifying key 20 in a natural operation feeling.

Figure 10:
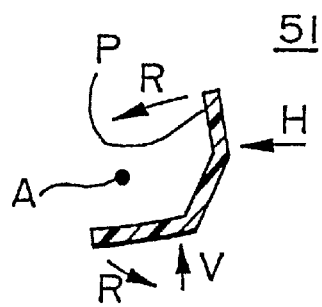
FIG. 10 shows a shape of a manipulating surface and a manner of operation of an L button the control-key device shown in FIGS. 1A, 1B, 1C, 1D, 1E, and 1F.

With reference to FIG. 10, the left and right L button 51 and R button 52 will now be described. FIG. 10 shows a sectional view (only showing a cutting surface) taken along a line IX—IX of FIG. 3 of the L button 51. With regard to the R button 52, because it is similar to the L button 51 except for the left and right directions are changed to each other, description thereof will be omitted.

The L button 51 is mounted to the top case 11 so that it may be rotated a predetermined angle about an axis A of shaft portions 51a and 51b shown in FIG. 3. Further, not shown in FIG. 3, a push button 51e (shown in FIG. 17B) is mounted to the circuit substrate 82 for the L button and another push button (not shown in the figures), being mounted to the circuit substrate 82, is provided for the R button. After the control-key device 10 has been assembled, an edge of the push button 51e comes into contact with a position P on the rear surface of the L button. If an operator then presses the L button in a position and a direction shown by H in the figure, the L button is rotated in a direction R. Thus, the edge of the push button 51e which comes into contact with the position P is pressed, and thus a contact pair in the push button 51e are short-circuited.

Further, if the operator presses the L button in a position and a direction shown by V in the figure, the L button 51 is also rotated in the direction R. Thus, similarly, the edge of the push button 51e which comes into contact with the position P is pressed, and thus the contact pair in the push button 51e are short-circuited.

A sectional shape of an outward shape of exposed sides (the right side and the bottom sides in FIG. 10) of the L button is L-shaped, and also a rotation axis thereof is located in the vicinity of an edge of one arm of the L-shaped sectional shape. Therefore, an operating button can be obtained in which it is possible to manipulate it in two directions perpendicular to each other. By applying such structures to the L button 51 and R button 52, manipulation of the L button 51 and R button 52 is easier and it is possible to smoothly manipulate these buttons.

Figure 18:
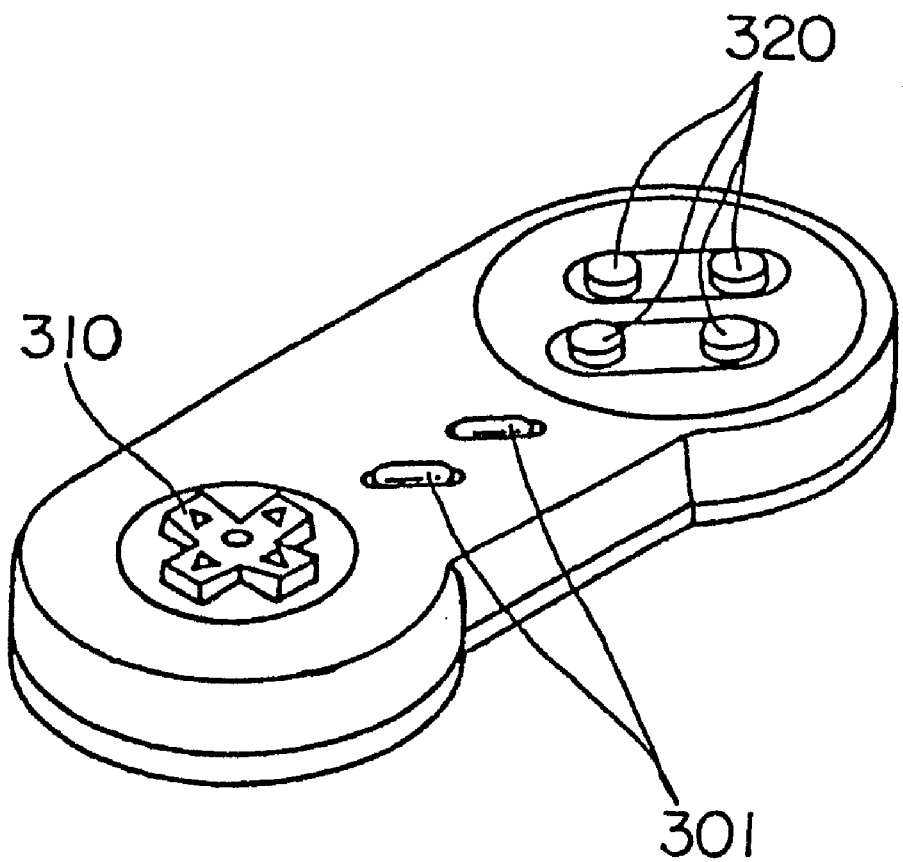
FIG. 18 shows a perspective view of an operating device in one example of the related art.

The rotation axes of the L button 51 and R button 52 extend along a direction approximately in parallel to a front surface of the control-key device 10, that is, along a horizontal direction obtained when an operator holds the control-key device 10 as shown in FIG. 2. Therefore, if the operator manipulates the buttons 51 and 52 using the forefingers of the left and right hands, each of the buttons is rotated in a direction perpendicular to a direction along which the forefinger extends, that is, a direction perpendicular to the paper sheet surface of FIG. 2. However, in the operating device in the prior art shown in FIG. 18, rotation axes of the two third operating units provided on the rear surface of the operating device and not shown in the figure, relevant to these L button and R button, extend along a direction perpendicular to a surface, on which the operating units 310 through 330 are provided, of the operating device 300, that is, along a direction which faces an operator when the operator holds the operating device 300. Therefore, if the operator manipulates these operating units using the forefingers of the left and right hands, these operating units are rotated in directions approximately in parallel to directions along which the forefingers extend.

In this structure of the operating units in the prior art, it is necessary that the finger tips of forefingers used for manipulating them are placed on predetermined surfaces on the operating units, that is, surfaces along the rear surface of the operating device 300, at all times when they are manipulated. The rear surface of the operating device 300 is a surface which is perpendicular to the surface on which the other operating units 310 through 330 are provided. If the finger tips are placed on a surface perpendicular thereto, that is, a surface along the surface of the operating device, on which surface the operating units 310 through 330 are provided, it would be difficult to rotate the operating units in the directions approximately in parallel to the directions along which the fingers extend.

Because of this structure of the operating device 300 in the related art, in the control-key device according to the present invention, the rotation axes extend approximately in parallel to directions along which the finger tips extend, and it is possible that the switch 51 can be easily rotated in the direction R when it is pressed in either the directions H or V shown in FIG. 10 as described above. That is, it is possible to easily manipulate the button 51 when the finger tip is placed on a surface approximately perpendicular to the surface on which the other buttons and so forth are provided, and it is also possible to easily manipulate the button 51 when the finger tip is placed on a surface approximately in parallel to the surface on which the other buttons and so forth are provided.

Figure 11:
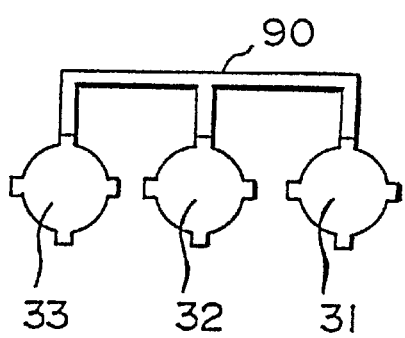
FIG. 11 shows a structure of a connecting member for temporarily fixing A, B and C buttons in the control-key device shown in FIGS. 1A, 1B, 1C, 1D, 1E, and 1F.

With reference to FIG. 11, how to assemble each of the A, B, C, X, Y and Z button 31, 32, 33, 41, 42, 43 into a respective one of the above-described button guiding portions 36, 36, 38, 46, 47 and 48 will now be described.

Each of the A, B and C buttons 31, 32 and 33 has an outer diameter approximately equal to one another. However, a length thereof is different from one another. That is, the outermost C button 33 is the shortest one and the innermost A button is the longest one. This is because, as shown in FIG. 1D, a curvature degree of the top case 11 is higher in a position as the position moves in the left and right directions, in comparison with the general curvature degree of the control-key device 10. That is, inclination angles in the left and right are larger in comparison with a portion near to the center. As a result, as shown in the figure, a height of the top case 11 in a position is smaller as the position moves leftward or rightward. In order to make them match this configuration of the control-key device 10 and also to make the heights of the A, B and C buttons 31, 32 and 33 projecting from the top case 11 uniform, configurations are applied such that the outermost C button 33 is the shortest one and the innermost A button is the longest one.

Further, letters A, B and C are engraved on the surfaces, shown in FIG. 1A, of these buttons 31, 32 and 33, respectively. Therefore, it is necessary that directions in which they are assembled into the top case 11 are predetermined directions. In a case where products of the control-key device 10 are manufactured in mass production, the presence of components in which have similar shapes but are necessary to be distinguished in assemble them may be a primary factor to degrade a production efficiency.

In order to solve such a problem, when the control-key device 10 in the first embodiment of the present invention is assembled, a connecting member 90 is used as shown in FIG. 11. The connecting member 90 is performed and is used for positioning when the three buttons 31, 32, and 33 are inserted into the button guiding portions 36, 37 and 38. Therefore, a mechanical strength of the connecting member 90 may be a weak one.

This connecting member 90 may be molded at the same time the buttons 31, 32 and 33 are formed in a resin molding process. That is, the connecting member and the buttons are molded in the integral molding method and thus they are in a unit without connecting to one another after being molded. As a result of providing such a connecting member temporarily in a manufacturing process, it is possible to easily and surely assemble the buttons 31, 32 and 33 to the button guiding portions 36, 37 and 38 in a single action. Further, it is also possible to easily and surely cause the insertion directions thereof to be the predetermined directions. Therefore, it is possible to improve the production efficiency of the control-key device 10.

The above description for the A, B and C buttons 31, 32 and 33 can also be applied to description for the X, Y and Z buttons 41, 42 and 43 as it is. Therefore, the description thereof will be omitted.

Figure 12:
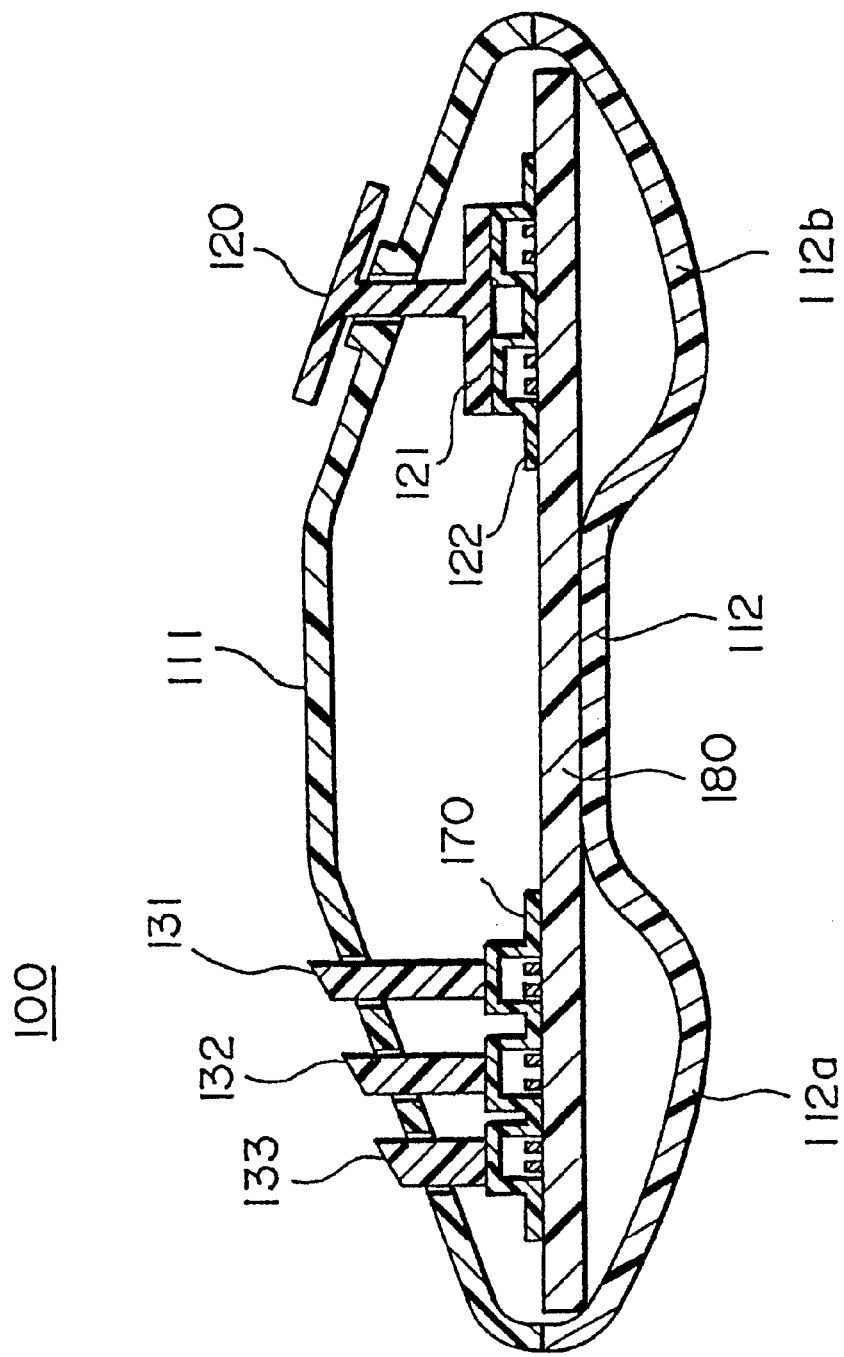
FIG. 12 is a longitudinal sectional view showing a basic structure of a control-key device in a second embodiment of the present invention.

With reference to FIG. 12, a control-key device 100 in a second embodiment of the present invention will now be described. FIG. 12 shows a longitudinal sectional view of the control-key device 100.

The control-key device 100 has functions approximately equivalent to those of the control-key device 10 in the first embodiment of the present invention in view of operating contents thereof. In a top case 111 thereof, similar to the top case 11 of the device 10, the left and right thereof are inclined downward in FIG. 12. However, a circuit substrate 180 relevant to the circuit substrates 81, 82 and 83 of FIG. 3 has a plane shape in a state in which it has been assembled into the device 100. Therefore, a rubber contact member 170 relevant to the rubber contact member 70 of FIG. 3 and a rubber contact member 122 relevant to the rubber contact member 22 of FIG. 3 are placed along the horizontal direction in FIG. 12.

In order to cause them to match this structure, an axis of each of A, B and C buttons 131, 132, 133 relevant to the A, B and C buttons 31, 32 and 33 extends in the vertical direction in FIG. 12. Similarly, an axis of a direction specifying key 120 relevant to the direction specifying key 20 extends vertically. Further, the top end surface of each of the buttons 131, 132 and 133 is inclined to match the inclination of the top case 111. Similarly, the top end surface of the direction specifying key 120 is inclined to match the inclination of the top case 111.

In a bottom case 112 of the control-key device 100, similar to the bottom case 12 of the control-key device 10 in the first embodiment, projecting portions 112a and 112b, similar to the projecting portions 12a and 12b, are provided in left and right portions of a bottom surface. By applying such a configuration, it is possible to make it similar to the control-key device 10 in the first embodiment in externals.

A control-key device 210 in a third embodiment of the present invention will now be described.

This control-key device 210 has a structure similar to that of the above-described control-key device 10 in the first embodiment of the present invention. Therefore, only parts different from relevant parts in the control-key device 10 in the first embodiment will be described and description for the parts having the same structures will be omitted.

The parts, in the structure of the control-key device 210 in the third embodiment, different from the structure of the control-key device 10 in the first embodiment are as follows: First, shapes of an L button 251 and an R button 252 shown in FIGS. 13A through 13F, and 14 are different from the shapes of the L button 51 and R button 52 in the control-key device 10 in the first embodiment, respectively. Next, shapes of button guiding portions 236, 237 238, 246, 247, 248 shown in FIG. 14 for guiding movement of the A, B, C buttons 31, 32, 33 and X, Y, Z buttons 41, 42, 43 are different from the shapes of the button guiding portions 36, 37, 38, 46, 47, 48 in the first embodiment. Further, these button guiding portions 236, 237, 238, 246, 247, 248 are not in a unit together with a top case 211, and are molded in a resin molding process to be in a unit together with a supporting plate 295 in an integral molding method, and are thus members separate from the top case 211. Further, a position of a rotation preventing portion 23e, shown in FIG. 14, of the rubber push member 21 is different from the position of the rotation preventing portion 23c in the control-key device 10 in the first embodiment.

First, structures of the button guiding portions 236, 237, 238, 246, 247, 248 will now be described with reference to FIGS. 14, 15A and 15B. As described above, the button guiding portions 236, 237, 238, 246, 247, 248 are separate from the top case 211. Therefore, it is possible to determine a mold removing direction applied when these button guiding portions are molded in a resin molding process independent of a mold removing direction applied when the top case 211 is molded in a resin molding process. Therefore, a direction along side walls of the cylindrical shapes constituting the button guiding portions may be determined to be the mold removing direction. As a result, it is not necessary to determine thicknesses of the one-side side walls to be changed in the taper manner as shown in FIG. 4B in the case of the first embodiment in which the resin molding of the button guiding portions should be performed using the mold removing direction of the top case resin molding process. Therefore, it is not necessary to apply comb-tooth configurations shown in FIGS. 4A and 4B. That is, by making the button guiding portions to be separate members from the top case 211, it is possible to make a thickness of a side wall of each of the button guiding portions to be approximately uniform, and, as a result, it is possible to make it be the minimum thickness required for achieving an essential function thereof of guiding a button.

A concave portion 295c having an outline shape of an approximately circle is provided on a surface, facing the top case 211, of the supporting plate 259. Further, matching this concave portion 295c, a convex portion 296 having an outline shape of a circle approximately the same as the outline shape of the concave portion 295c is provided in a portion, which the supporting plate 295 faces, of the inner surface of the top case 211. A concave surface of the concave portion 295c and a convex surface of the convex portion 296 are formed so as to approximately fit into each other. When it is mounted on the top case 211, it is mounted in a manner in which the, as shown in FIG. 15B, these concave portion 295c and convex portion 296 are fitted to one another.

Openings 236b, 237b, 238b, 246b, 247b, 248b are formed in the supporting plate 295. These openings are formed to be aligned with the inner wall surfaces of the above-mentioned button guiding portions 236, 237, 238, 246, 247, 248, respectively. Further, as shown in FIG. 14, openings 236a, 237a, 238a, 246a, 247a, 248a are formed within and in a periphery of the convex portion 296 of the top case 211. These openings are formed to match the openings 236b, 237b, 238b, 246b, 247b, 248b of the supporting plate 295, and are aligned with them when the supporting plate 295 is mounted to the inner surface of the top case 211 to be fitted thereto as shown in FIG. 15B. As a result, the openings 236a, 237a, 238a, 246a, 247a, 248a of the top case 211, the openings 236b, 237b, 238b, 246b, 247b, 248b of the supporting plate 295, and the inner wall surfaces of the button guiding portions 236, 237, 238, 246, 247, 248 are aligned with one another respectively, and thus guide movement of the A, B, C buttons 31, 32, 33 and X, Y, Z buttons 41, 42 and 43.

Three supporting plate guiding rods 296a, 296b, 296c are formed to project around the convex portion 296 and openings 236a, 237a, 238a, 246a, 247a, 248a of the inner surface of the top case 211. These supporting plate guiding rods 296a, 296b, 296c are provided in positions such that they come into contact with a side surface on the periphery of the supporting plate 295 when the supporting plate 295 is placed on a predetermined position. Therefore, by fitting the supporting plate 296 inside the three supporting plate guiding rods, the supporting plate 295 is placed on the predetermined position of the inner surface of the top case 211, and the above-mentioned concave portion 295c of the supporting plate 295 and the convex portion 296 of the top case 211 are fitted to each other as described above.

Mounting of the supporting plate 295 on the inner surface of the top case 211 can be performed only by fitting thereto as described above. It is not especially necessary to use an adhesive agent to bond them together. After it has been fitted thereto, the buttons 31, 32, 33, 41, 42, 43 are inserted into the button guiding portions 236, 237, 238, 246, 247, 248 respectively, and the bottom case 12 on which the circuit substrates 81, 82, 83 are fixed is screwed to the top case 211 via the rubber contact member 70 and so forth. As a result, the supporting plate 295 is supported in the top case 211 as a result of being sandwiched between it and the bottom case 12 via the buttons, rubber push member and circuit substrates.

Figure 14:
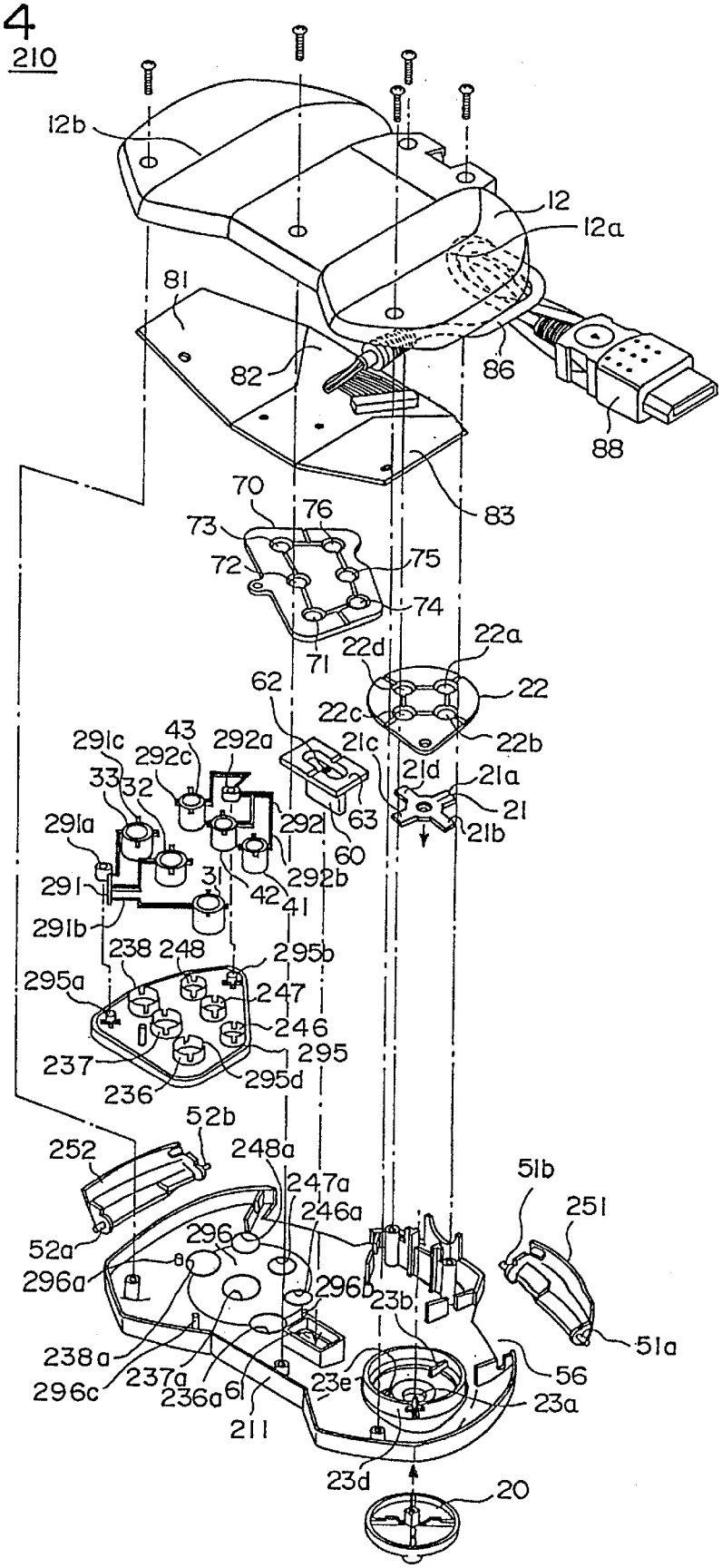
FIG. 14 shows an exploded perspective view of the control-key device shown in FIGS. 13A, 13B, 13C, 13D, 13E, and 13F.
Figure 15A:
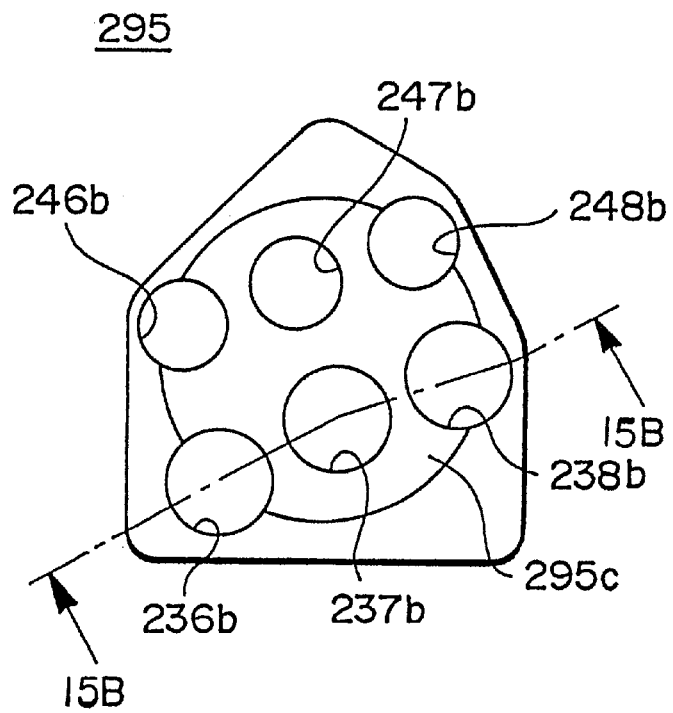
FIG. 15A shows a plan view of a surface, to be fitted into an inner surface of a top case, of a supporting plate used in the control-key device shown in FIGS. 13A, 13B, 13C, 13D, 13E, and 13F.
Figure 15B:
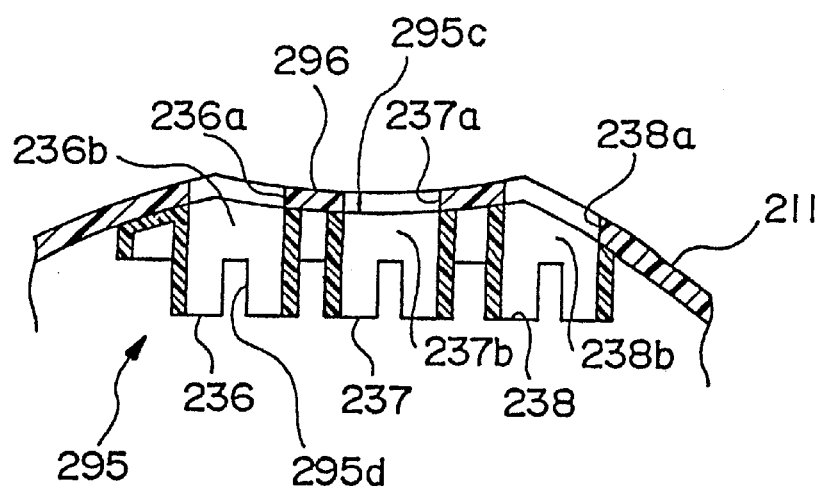
FIG. 15B shows a side elevational sectional view along a line B—B of FIG. 15A, showing a state in which the supporting-plate of FIG. 15A has been fitted into the top case.

Projections 291c or 292c are provided in four directions meeting at 90 degrees as shown in FIG. 14 on the outer wall surface of each of the buttons 31, 32, 33, 41, 42, 43. However, a projection of a direction of these four directions is in a unit together with a connecting arm 291b or 292b of a connecting member 291 or 292. Further, slits 295d are formed in four directions meeting at 90 degrees as shown in FIGS. 14 and 15B to match the above-mentioned projections 291c or 292c on a wall surface of each of the button guiding portions 236, 237, 238, 246, 247, 248.

As shown in FIG. 14, three connecting arms 291b and three connecting arms 292b of the above-mentioned connecting members 291 and 292 are connected to mounting pipes 291a and 292a, respectively. To match these mounting pipes 291a and 292a, mounting projections 295a and 295b are provided on the supporting plate 295. When the buttons are inserted into the button guiding portions, as shown in FIG. 14, as the buttons 31, 32, 33, 41, 42, 43 are connected to one another to be two sets thereof, they are inserted into the button guiding portions 236, 237, 238, 246, 247, 248 respective, and also the mounting pipes 291a and 292a of the connecting members 291 and 292 are fitted into the mounting projections 295a and 295b respectively. At this moment, the projections 291c, 292c of each of the buttons are inserted into the slits 295d of a respective one of the button guiding portions respectively. As a result, each button is easily loaded in a respective one of the button guiding portions along a correct direction. Therefore, the letters "A", "B", "C", "X", "Y", "Z" engraved on the surfaces of the buttons respectively are along correct directions as shown in FIG. 2.

The connecting members 291 and 292 are molded in a resin molding process to be in units together with buttons in the integral molding method respectively. Further, after the buttons are correctly inserted into the button guiding portions, it is not especially necessary to remove these connecting members. That is, there will occur no problems even if they are included in the product.

Figure 16:
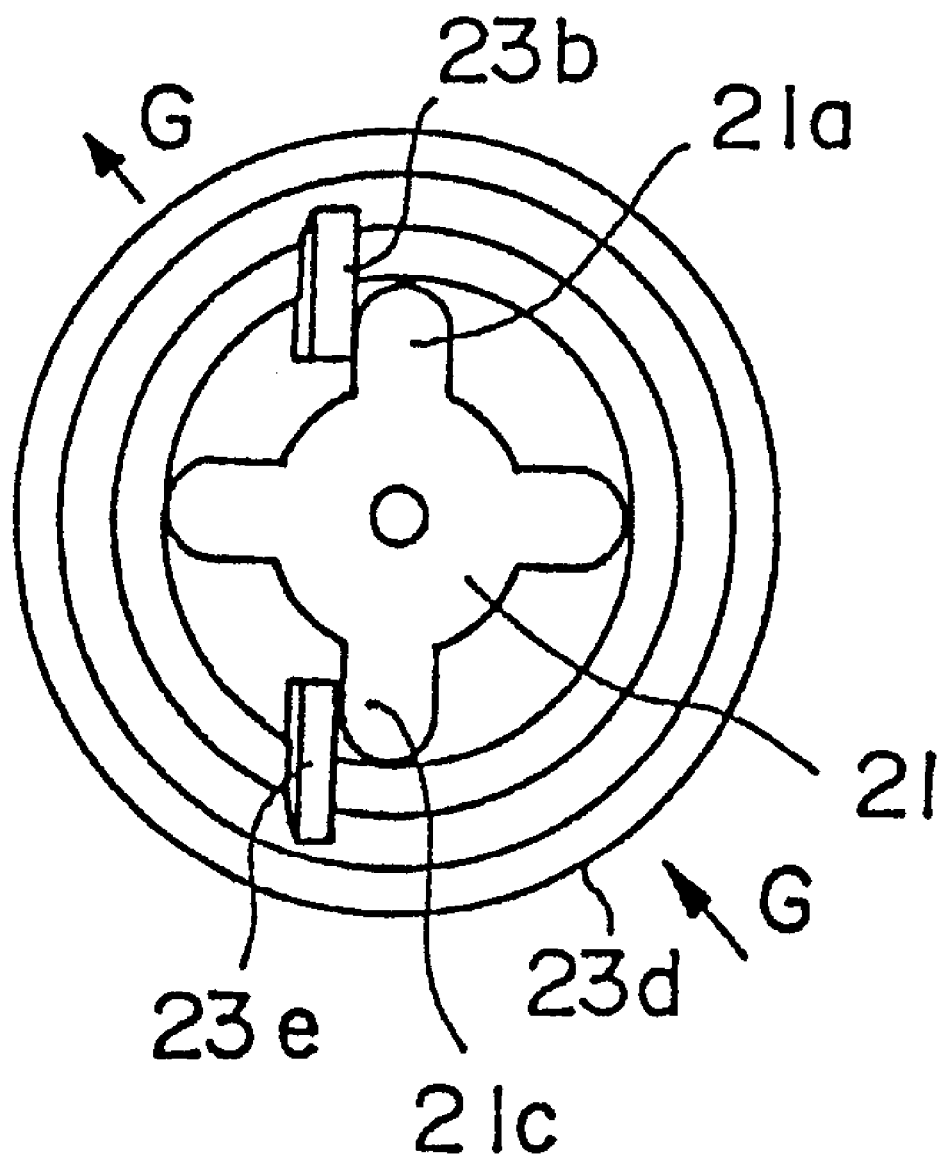
FIG. 16 shows positions at which rotation preventing portions are provided in the control-key device shown in FIGS. 13A, 13B, 13C, 13D, 13E, and 13F.

The rotation preventing portion 23e for the rubber push member 21 will now be described. The rotation preventing portion 23e is provided, as shown in FIG. 16A, in a position adjacent to the other extending portion 21c extending along a direction reverse to the extending direction of the extending portion 21a, of the rubber push member 21, adjacent to the other rotation preventing portion 23b. This rotation preventing portion 23e is, similar to the rotation preventing portions 23b and 23c in the first embodiment shown in FIG. 5A, provided at the lower side, in the inclination surface of the top case 11, of the extending portion 21c of the rubber push member 21. (This lower side is a side reverse to a side in which the bottom case 12 is located when the bottom case 12 is appropriately incorporated with the top case 211.) Therefore, by a reason the same as the above-described reason, the rotation preventing member 23e can be formed in a shape similar to the shape of the rotation preventing portion 23b. Therefore, it is possible to apply a shape in which no problem will occur for a mold removing direction in a resin molding process.

Figure 17A:
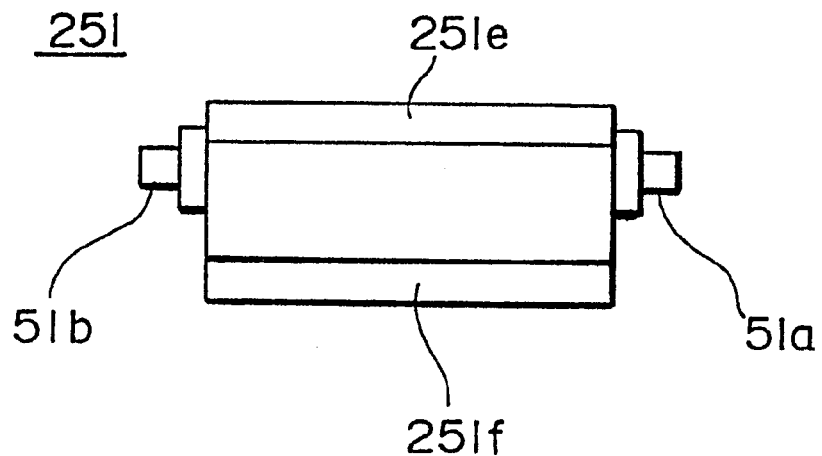
FIG. 17A shows a front view of an L button in the control-key device shown in FIGS. 13A, 13B, 13C, 13D, 13E, and 13F.
Figure 17B:
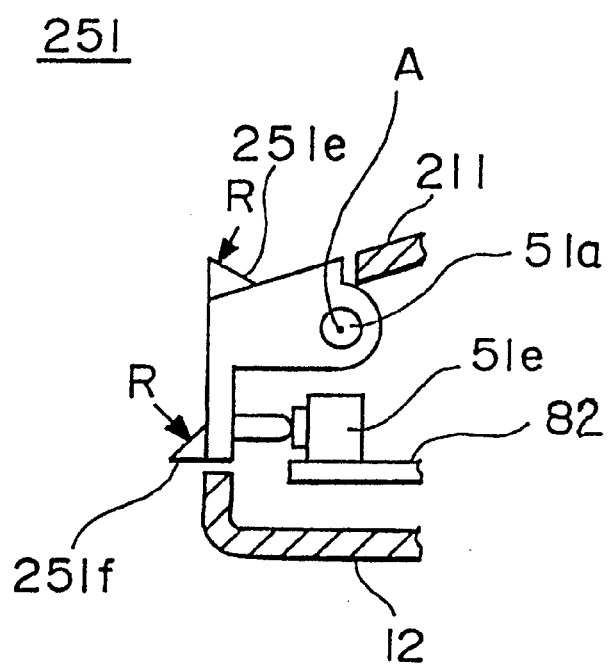
FIG. 17B shows a side elevational view of the L button of FIG. 17A, showing a state in which it has been incorporated into the device.

The L button 251 and R button 252 will now be described with reference to FIGS. 17A and 17B. These buttons 251, 252 have structures similar to the buttons 51 and 52 used in the first embodiment. Therefore, only different structures will be described and description of common structures will be omitted. In FIG. 17B, the button 51e operated by the button 251 is provided on the top-case side of the circuit substrate 82. However, it is also possible to provide the button 51e on the bottom-case side of the substrate 82. Such difference may occur due to merely selection in designing and either cases may be applied depending on particular design conditions. Further, except for the left and right being reversed, a configuration of the R button 252 is the same as a configuration of the L button 251. Therefore, description of the R button will be omitted.

In such a push button (L button 251) which has the rotation axis 51a (A) and is rotated when being manipulated, it is preferable that a surface on which a finger tip comes into contact is a surface perpendicular to the rotation direction R. If it is so, a pressing force applied by the finger tip can be most effectively used as a rotating force of the button 251. However, if it is not so, the finger tip may slide on each operating surface and the pressing force may not always be effectively used. Therefore, ideally, it is preferable that the button 251 is formed so that each operating surface is in a direction perpendicular to the rotation direction. However, in such a kind of product, an external appearance design is essential as a factor of each component design. Therefore, it is necessary to select a shape in which such a request of external appearance design can be fulfilled and also a pressing force applied by a finger tip can be effectively used as a rotating force. In order to fulfill the requests, as shown in FIG. 17B, projections 251e and 251f are provided at positions most distant from the rotation axis A on operating surfaces 251g and 251h, respectively.

A surface perpendicular to the rotation direction R is provided on each of these projections 251e and 251f. By providing these surfaces, it is possible to realize a shape of the button 251 in which it is easy to press it and also it is not easy to slide on it. In FIG. 17B, for the sake of explanation, the projections 251e and 251f are shown in a manner in which the feature is emphasized. However, actually, due to the above-mentioned external appearance request and so forth, a shape consisting of a smooth curved surface is applied.

Further, the present invention is not limited to the above-described embodiments, and variations and modifications may be made without departing from the scope of the present invention.

What is claimed is:

1. A control-key device having a direction specifying key for mounting on a housing which an operator manipulates to control the play of video games, comprising a manipulating surface of said direction specifying key wherein said manipulating surface has a concave shape, and on a periphery of said concave share is a plurality of smaller concave portions spaced about said periphery and comprising front, rear, left, and right directional controls.

2. The control-key device as claimed in claim 1, wherein each of said plurality of smaller concave portions are inclined toward the center of said direction specifying key.

3. A controller for a video game comprising:

at least one button adapted to be depressed by a thumb; and a hand-held housing having an inserting hole in which said button is inserted in a manner in which said button is movable along an axis direction thereof, said hand-held housing defining a plane meeting at a predetermined angle with a plane perpendicular to said axis direction of said button, and a projecting end of said button including an upper surface defining a plane parallel to the plane in which said hand-held housing extends.

4. The controller according to claim 3, wherein:

said hand-held housing has a curved shape suitable for two hands of an operator to hold it; and said hand-held housing extends along the plane which meets at the predetermined angle with the plane perpendicular to the axis direction of said button so as to match said curved shape.

5. A control-key device for video games having a hand-held housing, comprising a push button, mounted on the edge of said housing and having a rotation axis and a plurality of operating surfaces, each of said plurality of operating surfaces being provided with a projection which forms a surface perpendicular to a rotation direction defined by said rotation axis to convert a pressing force on said surface to a rotational force.

6. The control-key device claimed in claim 5, said projection being provided at a position of the relevant operating surface most distant from said rotation axis.

* * * * *